United States Patent [19]
Galen

[11] 3,782,014
[45] Jan. 1, 1974

[54] ROTATABLE DISPLAY DEVICE

[76] Inventor: Allen Galen, 3470 Lake Shore Dr., Chicago, Ill. 60657

[22] Filed: Jan. 8, 1973

[21] Appl. No.: 321,666

[52] U.S. Cl................. 40/64 R, 40/68.6, 40/78.03
[51] Int. Cl............................................. G09f 11/30
[58] Field of Search................. 40/28 R, 64 R, 68, 40/68.6, 74, 65, 63 R, 30, 78, 78.03, 78.07, 79, 106.25, 106.51, 106.52, 33, 36; 350/4; 46/37

[56] References Cited
UNITED STATES PATENTS

| | | | |
|---|---|---|---|
| 435,388 | 9/1890 | Bolton | 40/68 |
| 470,034 | 3/1892 | Belknap | 40/30 |
| 1,068,621 | 7/1913 | Abraham | 40/152 |
| 3,430,371 | 3/1969 | Phillips | 40/61 R |

Primary Examiner—Robert W. Michell
Assistant Examiner—Milton C. Y. Mui
Attorney—Norman Lettvin

[57] ABSTRACT

A rotatable display device which has a central display aperture in its front face where each of a plurality of photographs or the like may be viewed individually in sequence. The device is arranged for generally vertical orientation and the photograph at the display aperture may be changed by rotating the device about a horizontal axis. An internal gravity-actuated mechanism maintains all but one photograph in a stored position and prevents movement of a second stored photograph to the viewing position until the first photograph has moved from the viewing position to its stored position.

10 Claims, 9 Drawing Figures

PATENTED JAN 1 1974
3,782,014
SHEET 1 OF 3
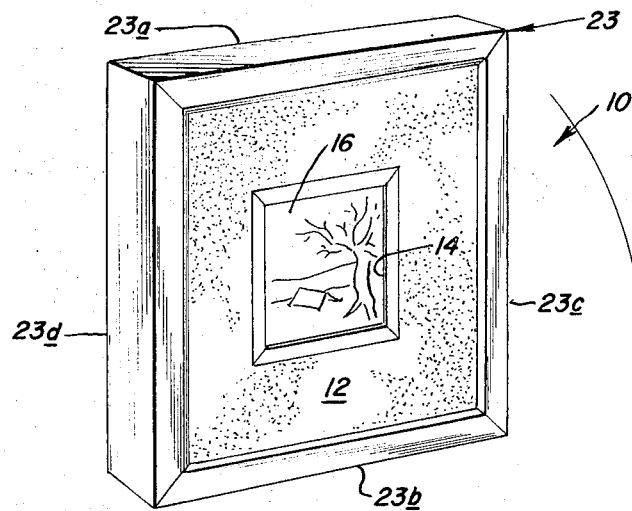
FIG. 1
FIG. 5
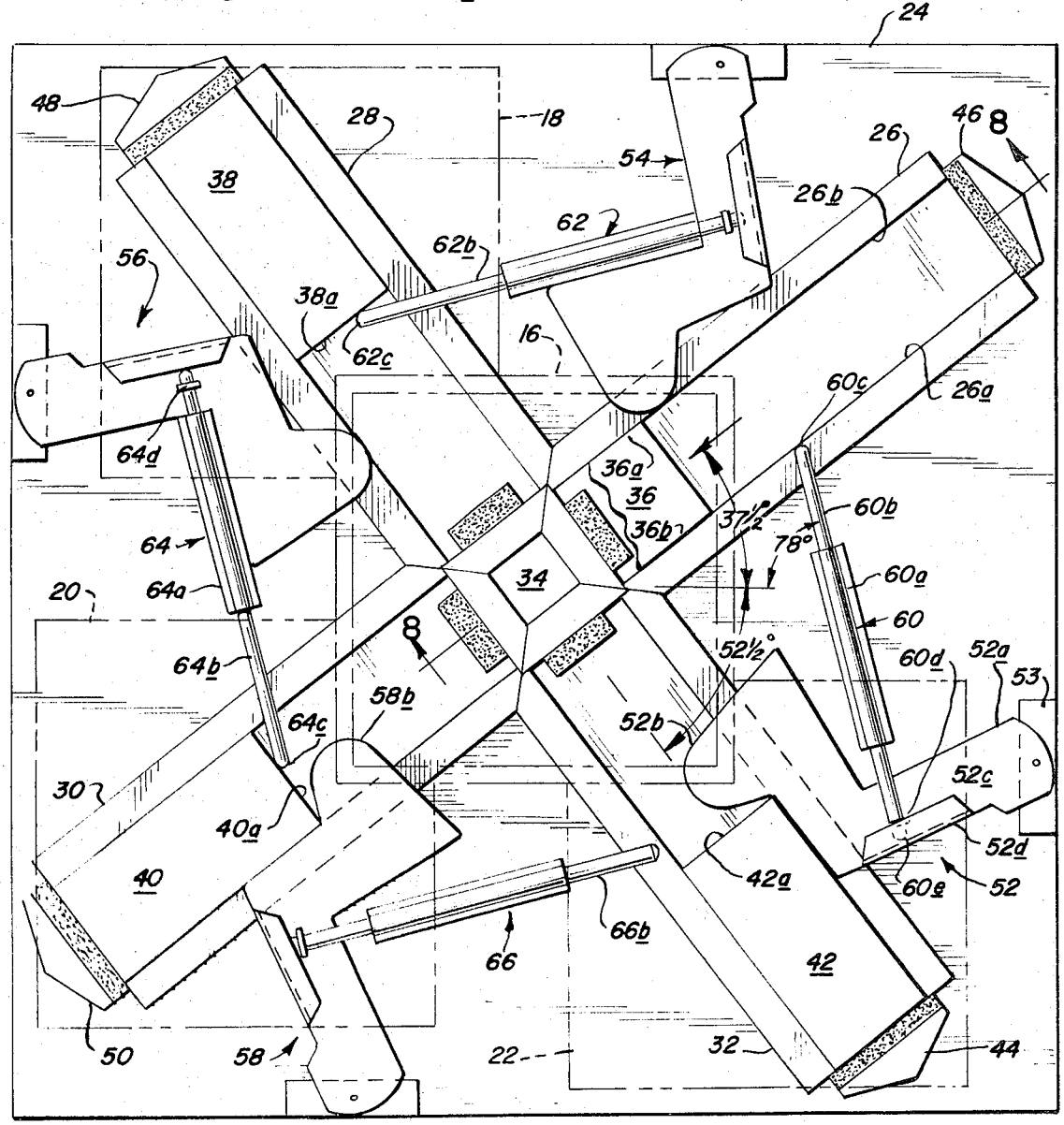

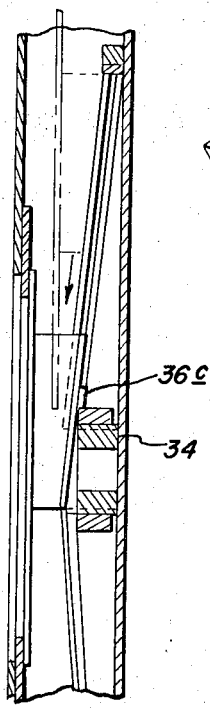
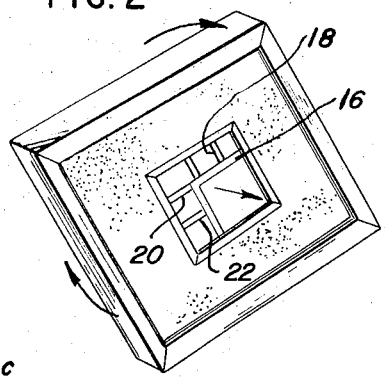
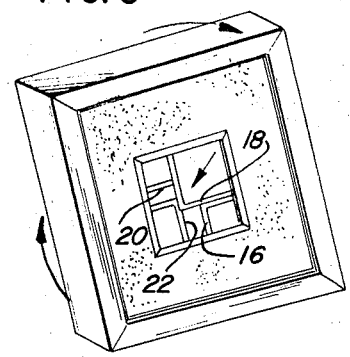
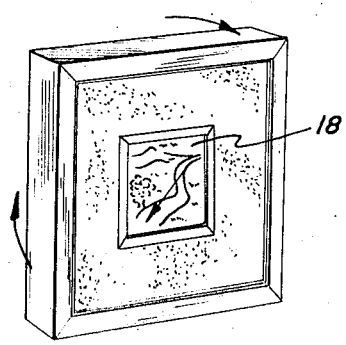
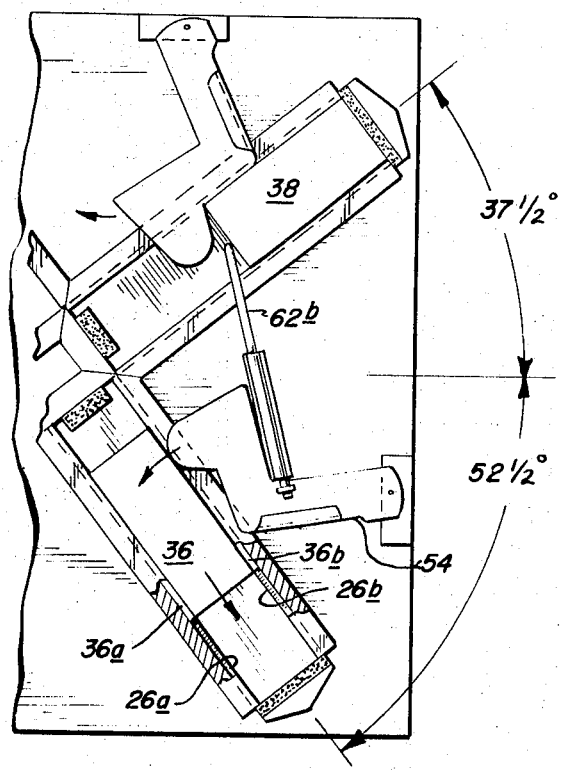
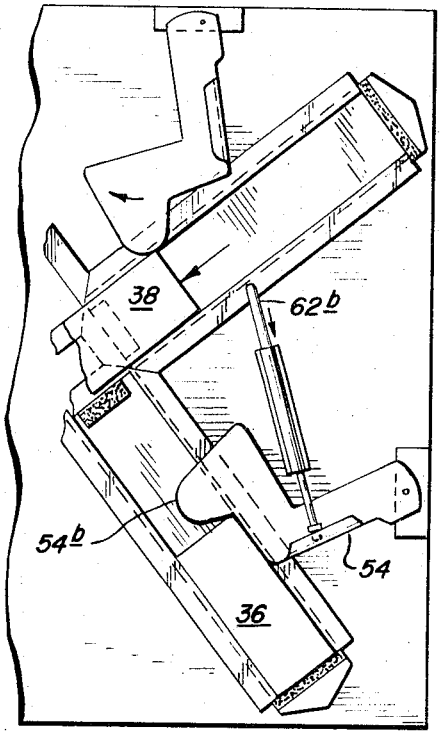

ROTATABLE DISPLAY DEVICE

BACKGROUND OF THE INVENTION

This invention relates to devices for displaying each of a plurality of photographs or other indicia-bearing members one-at-a-time at a display aperture.

Individuals frequently display photographs in groups or clusters. However in such an arrangement each detracts from the other. Moreover, people view only one photograph at a time and after an extended period may tire of that photograph. Using a single frame and changing the photographs therein is inconvenient while framing each of a plurality of photographs individually may be expensive. Therefore, it is an object of this invention to provide a display device in which a plurality of photographs may be stored and be brought to a viewing aperture one-at-a-time.

Devices are available for displaying a plurality of indicia-bearing members one-at-a-time. However, these may be bulky or complex, may require power operation and may not be esthetically pleasing. For example, persons may not want to use such devices in their home or office. Another object of this invention is to provide a display device which is of relatively simple construction, easy to operate and esthetically pleasing.

These and other objects will become apparent from the following description and appended claims.

SUMMARY OF THE INVENTION

There is provided by virtue of this invention a device which in one embodiment is in the form of a relatively thin, vertically-positionable picture frame having a central viewing and display aperture to which each of a plurality of photographs, stored within the frame, are movable one-at-a-time upon rotation of the frame about a horizontal axis. The device includes a gravity-operated system which permits only one picture to be located at the viewing aperture and prevents the other pictures from moving to the viewing position from the stored position when the first is in the viewing position. Furthermore, the device can be made in many attractive forms for hanging on a wall, arrangement on a desk or the like.

It will be appreciated that this device is not limited to use in displaying photographs, portraits or paintings and may find utility in advertising displays, children's toys, calendars and the like. For example, this device can be used to tell a story or convey a message by sequentially displaying a series of illustrations or cartoons.

BRIEF DESCRIPTION OF THE DRAWINGS

FIG. 1 is a perspective view of the picture frame embodiment of the device of this invention showing a first photograph at the display aperture;

FIGS. 2, 3 and 4 are perspective views showing the frame in different positions of rotation about a horizontal axis, whereby the first photograph is replaced by a second;

FIG. 5 is a front elevational view of the interior of the device showing the gravity-operated system for controlling the movement of photographs to-and-from the central aperture;

FIGS. 6 and 7 are fragmentary elevational views with FIG. 6 showing the mechanism in its position as a first photograph is moving from the viewing position toward the stored position and a second photograph is about to move to the viewing position, and with FIG. 7 showing the mechanism after the first photograph has moved to the stored position and the second is in the viewing position;

FIG. 8 is a fragmentary sectional view taken substantially along line 8—8 of FIG. 5 showing a portion of a track system associated with the control system.

DESCRIPTION OF THE PREFERRED EMBODIMENT

Figure 9:
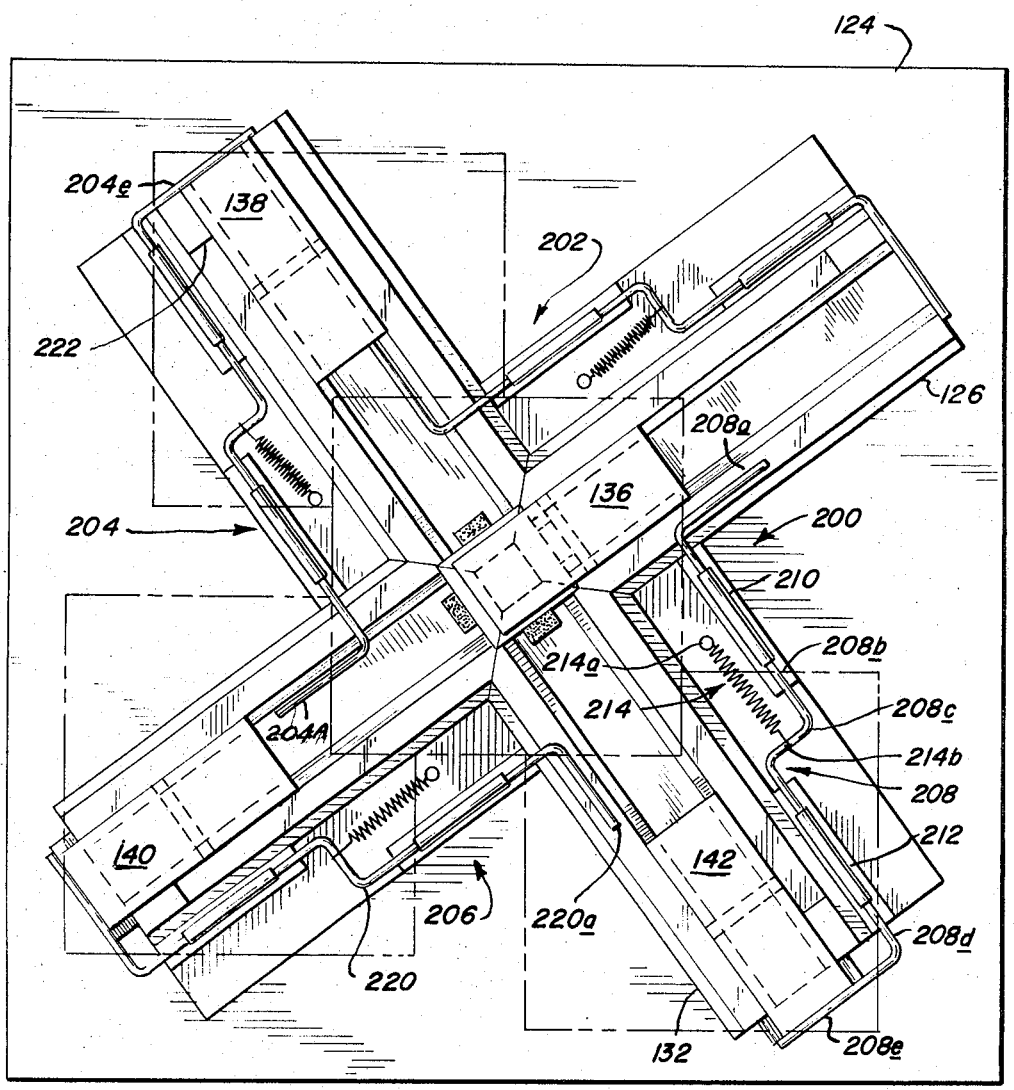
FIG. 9 is a front elevational view of an alternative system for controlling the movement of the photographs to-and-from the viewing aperture.

Referring now to the drawings, there is shown a picture frame embodiment of this invention which includes a box-like housing 10 having a front face or panel 12 with a central viewing aperture 14 at which a photograph 16 is displayed.

The housing is arranged to be positioned at a substantially vertical attitude and for rotation about a horizontal axis which is generally transverse to the plane of the viewing aperture and passes therethrough. By rotating the housing in a clockwise direction about the horizontal axis the photograph 16, by gravity, moves from its central viewing position toward a storage position in the lower right-hand corner of the housing, and thereafter the second photograph 18 moves from a stored position in the upper right-hand corner to the central viewing position. The housing can be rotated in only one direction to effect proper movement of the photographs. However, movement is not limited to the clockwise direction, since by appropriate arrangement, movement can be in the counterclockwise direction. Using this particular embodiment, each of four photographs can be displayed one-at-a-time in an endless sequence as the frame is rotated. Thus, while the first photograph 16 is in a viewing position, the second, third and fourth photographs 18, 20 and 22 respectively are in stored positions, and when the second photograph 18 is in a viewing position other photographs 16, 20 and 22 are in stored positions and so on. By appropriately arranging the photographs or rorating the housing any one of these photographs can be brought into viewing position while the other photographs remain in the stored position.

A frame 23 defines the top, bottom and side walls, 23a, 23b, 23c and 23d and carries the front face 12 as well as the back support plate 24 which is positioned in generally parallel spaced relation to the front face. Four elongated track sections 26, 28, 30 and 32 are carried on the back plate 24 and are arranged at right angles with respect to each other. Therefore, after the frame is rotated 90° each section is in the same position as its leading or preceding section. When a photograph is in the viewing position the tracks, in the upper and lower right-hand positions, such as 26 and 32, are arranged at acute angles with respect to the horizontal plane within which the axis of rotation lies. Thus the track in the upper position is preferably at a shallow angle of about 45° or less, and the track in the lower position is at a steep angle of about 45° or more. More specifically, track 26 is at an angle of 37 ½° and track 42 is at an angle of 52 ½°.

An inner abutment member 34 is positioned at the intersection of the tracks and is substantially centered behind the viewing aperture 14 and outer stop members such as 44, 46, 48 and 50 are positioned at the end of each track. For optimum operation each track slopes from the back support toward the aperture so that the end adjacent the outer stop is closer to the back support plate than the end adjacent the inner abutment member. In this preferred embodiment the track slopes in an angle of about 5°.

Four photograph carriers 36, 38, 40 and 42 are provided for sliding cooperation with the tracks between the outer position and the inner position. The carriers such as 36 include side-edge flanges, such as 36a and 36b, which cooperate with side-edge grooves such as 26a and 26b in each of the tracks. A carrier abutment member such as 36c is mounted on the underside of each carrier for cooperation with the inner abutment 34 to position the carrier and its photograph at the viewing aperture 14 and for cooperation with the outer stops such as 46 to limit the carrier's outward movement.

In order to permit only one photograph to be displayed at a time a gravity-actuated blocking system is provided for cooperation with pairs of adjacent carriers, in which one carrier is in leading relation to the other or trailing carrier. The system includes the L-shaped lever arms 52, 54, 56 and 58 and the lock assemblies 60, 62, 64 and 66 which coact with the carriers to permit or prevent movement thereof to the inner position. The arm 52 and assembly 60 cooperate with the leading carrier 42 and trailing carrier 36 to control movement of the carrier 36. Although carrier 36 is in trailing relation to carrier 42 it is in leading relation to carrier 38 and carrier 56 cooperates with arm 54 and assembly 62 to control the movement of carrier 38. This leading-trailing relationship exists for each pair of carriers adjacent a blocking system.

Each of the L-shaped lever arms is pivotally mounted at one end, such as 52a, to a block such as 53, which is carried on to the back plate 24. The other end 52b of the arm is shaped in the form of a latching tongue and cam for engagement with the inner end 42a of the carrier 42 and one side edge 42b thereof. The leg 52c which extends from the pivot toward the track includes a channel-shaped receiving section 52d.

Each of the lock bar assemblies, such as 60, includes a guide sleeve 60a which is carried on the back support plate 24 for positioning the rod 60b, which slides therein, for movement between a blocking position wherein one end 60c is positioned adjacent the inner edge of the carrier 36 and a non-blocking position outwardly of the track guides 26b. A stop member 60d is provided adjacent the other end 60e of the rod 60b for abutment with the adjacent end of the sleeve 60a. The end 60e is arranged to be received in the channel-receiving portion 52d of the lever arm 52. To provide proper blocking and gravitational movement the lock assemblies are arranged such that when they are in the lower right-hand position they form an acute angle to the horizontal plane, preferably about 78°.

The carrier, track, lever and slide bar assemblies operate and cooperate under the influence of gravity. In a position such as in FIG. 5 the carriers 40 and 42 and their photographs 20 and 22 remain in a lower stored position by their weight and gravity. The slide bar 60b is in a downward position, received by the channel 52d where it operates to hold the lever arm 52 in a position where the latching tongue 52b engages the inner edge 42a of the carrier 42. The slide bar 66b cooperates with the lever arm 58 so that the latch tongue 58b latchingly engages the inner edge 40a of the carrier 40.

Gravity pulls the slide bar 64b downwardly to a blocking position where its end 64c extends across the track 30, abuts the inner edge 40a of the carrier 40, and the lever arm 56 is in a non-blocking position. Downward movement of the slide bar 64b in the sleeve 64a is limited by the abutment of the end 64c against the inner edge 40a as well as by the stop member 64d which cooperates with the sleeve 64. Gravity and the weight of carrier 38 maintains the end 62c of the slide bar 62b against the inner edge 38a of the carrier 38 so as to prevent carrier 38 from moving downwardly along the track 28.

When the housing is rotated 90° in a clockwise direction (as in FIGS. 6 and 7) the leading carrier such as 36 drops under the influence of gravity from its inner viewing position to the outer stored position which then permits the lever arm 54 and slide rod 62b to drop. After the bar 62b drops the trailing carrier 38 moves to its inner position where its photograph 18 is in the viewing position. This sequence of events occurs each time the frame is rotated 90° and thus the upper-right-hand trailing carrier cannot move downwardly until the lower-right-hand leading carrier is in its stored position.

As explained before, the tracks are arranged such that the track in the lower-right-hand position is preferably at a steeper angle to the horizontal than the track in the upper-right-hand position so that the leading carrier in the lower-right-hand position moves more rapidly toward its stored position than the trailing carrier in the upper-right-hand position moves toward its viewing position, thereby reducing jamming resulting from interference of the carriers or photographs. The back-to-front slope of the tracks further aids in preventing jamming of the mechanism which might be caused by the photographs striking one another. By virtue of this slope the three photographs in the stored position are in a plane closer to the back support member than the photograph in the viewing position which is in a plane further away from the back support member. Moreover, inasmuch as the photograph and carrier moving into the viewing position cannot move until all of the other photographs are in a stored position, jamming is substantially prevented.

In order to assure proper operation of the mechanism the weights of the slide bars, carriers, etc. can be adjusted. For example, the photographs can be carried on metal-mounting plates secured to each of the carriers and the plates can provide additional weight to assure quick gravitational operation.

Referring now to FIG. 9, there is shown another embodiment of the gravity-controlled system. This embodiment operates in basically the same manner as the embodiment described hereinbefore. Like parts will carry the same reference numerals as previous parts with the exception the # 100 will be added thereto. For example, the back plate in this embodiment carries the reference numeral 124 where as the back plate in the previous embodiment carries the reference numeral 24. New elements will carry # 200 series reference numerals.

The principal difference between these two embodiments resides in the use of spring-operated lever mechanisms 200, 202, 204 and 206 for controlling the movement of the carriers. Each mechanism, such as 200, includes a double-acting, shaped-metal, control rod 208 which slides in a pair of stationary guide sleeves 210 and 212. The control rod 208 is shaped so as to provide: an inner leg 208a, arranged generally parallel to the track 126; a bearing section 208b arranged at right angles to the leg 208a for movement within the sleeve 210; a short, intermediate spring-engagement section 208c at right angles to the bearing section 208b; a second bearing section 208d at right angles to the intermediate section 208c for movement within the sleeve 212; and an outer leg 208e arranged at right angles to the section 208d to extend transversely across the outer end of the track section 132 and for engagement with the carrier 142. The coiled tension spring 214, secured at one end 214a to the back support 124 and at the other end 214b to the intermediate section 208c, biases the rod 208 in a generally inward direction. In operation, the force of the leading carrier 142 descending from its viewing position and striking the leg 208e moves the entire rod downwardly so as to move the end of leg 208a out of engagement with the inner edge of the trailing carrier 136 to permit it to move to the inner viewing position.

When the control rod is in the lower left-hand position, the weight of the leading carrier holds it in the non-blocking position. However, when the frame is rotated so that the rod is in the upper-left-hand position it drops by its own weight to a blocking position with the outer leg such as 204e engaging the outer stop member 222 and the end of the inner leg 204a blocking the trailing carrier 140. In this position carrier 138 which is in trailing relation to carrier 136 is held in the stored position by the control rod of mechanism 202. In the upper-right-hand position the rod remains in the blocking position and is moved therefrom in the lower-right-hand position by the descending carrier.

It will be appreciated that numerous changes and modifications can be made to the embodiment shown herein without departing from the spirit and scope of this invention.

What I claim and desire to secure by Letters Patent of the United States is:

1. In a display device for displaying at a viewing aperture individually and in sequence each of a plurality of indicia-bearing members, the improvement which comprises said device including: a houing arranged for positioning at a substantially vertical attitude which includes frame means and a front face, carried by said frame means, having a central display aperture therein, and said housing being adapted for rotation about a substantially horizontal axis normal to and passing through said aperture; a plurality of elongated track means carried by said frame means, each of which extend between an inner position adjacent said aperture and a position outwardly therefrom and each of which is arranged for positioning in acute angular relation with respect to the horizontal plane in which said horizontal axis lies; a plurality of gravity-movable carrier means on which each of said indicia-bearing members is carried, each of said carrier means being in slidable engagement with one of said track means for movement between said inner position where said indicia-bearing member is brought into registry with said display aperture and said outer position where said member is stored in a non-viewing position; and gravity-controlled blocking means operatively associated with said carrier means for selectively permitting only one of said carriers to move the indicia-bearing member to the inner registry position while preventing other of the carriers from moving from the stored position to the viewing position.

2. A device as in claim 1 wherein there is provided a plurality of blocking means, each operatively associated with pairs of carriers, one carrier being in leading relation to the other or trailing carrier, for preventing movement of the trailing carrier to the viewing position when the leading carrier is in the viewing position and for permitting movement of the trailing carrier to the viewing position after the leading carrier has moved from the viewing position to the stored position.

3. A device as in claim 2 wherein abutment means are provided at the inner end and outer end of each of said track means for abutting engagement by said carrier means in said track means for limiting movement and positioning said carriers.

4. A device as in claim 3 wherein each of said track means is arranged with respect to said aperture so that said track means slopes from its outer end to its inner end toward said aperture.

5. A device as in claim 4 wherein there are provided four track means arranged at right angles to one another with the intersection thereof positioned in substantial alignment with said display aperture and horizontal axis so that when each track means is in an upper position wherein the carrier associated therewith is in the viewing position, the track means forms an acute angle of about 45° or less with the horizontal.

6. A device as in claim 5 wherein when each track means is in a lower position below the upper position and its carrier is in the stored-away position the track means forms an acute angle of about 45° or more with the horizontal.

7. A device as in claim 6 wherein said blocking means include a plurality of slide lock means for movement between an extended position blocking the trailing carrier when the leading carrier is in the viewing position and a retracted position non-blocking position when the leading carrier is in a lower stored-aay position so that said trailing carrier is movable to the viewing position.

8. A device as in claim 7 wherein each slide lock means includes elongated sleeve guide means, an elongated bar slideably received in said sleeve means and abutment means associated with said bar means for limiting movement of the bar in the sleeve between said blocking and non-blocking positions.

9. A device as in claim 6 wherein said blocking means include a plurality of biased control rod means carried on said frame, arranged such that one end of said control rod means is positioned for engagement by the leading carrier and the other end is positioned and adapted to engage the trailing carrier.

10. A device as in claim 9 wherein each of said control rods whose ends are engaged by a leading carrier in a lower position have the other ends in a retracted non-blocking position and each of said control rods whose ends are associated with carriers in an upper position have their other ends in a blocking position so that one carrier is movable to the viewing position.

* * * * *